US008028719B2

(12) United States Patent
Johnson

(10) Patent No.: US 8,028,719 B2
(45) Date of Patent: Oct. 4, 2011

(54) CONTROL STOP AND FLUSHING SYSTEM

(75) Inventor: Dwight N. Johnson, Carlsbad, CA (US)

(73) Assignee: Sloan Valve Company, Franklin Park, IL (US)

( * ) Notice: Subject to any disclaimer, the term of this patent is extended or adjusted under 35 U.S.C. 154(b) by 256 days.

(21) Appl. No.: 12/510,025

(22) Filed: Jul. 27, 2009

(65) Prior Publication Data
US 2009/0283156 A1 Nov. 19, 2009

Related U.S. Application Data

(62) Division of application No. 11/445,399, filed on Jun. 1, 2006, now Pat. No. 7,565,914.

(51) Int. Cl.
F16K 1/00 (2006.01)
(52) U.S. Cl. ........ 137/628; 137/883; 137/471; 137/473; 4/342
(58) Field of Classification Search .................. 137/628, 137/629, 471, 472, 473, 883; 4/342
See application file for complete search history.

(56) References Cited

U.S. PATENT DOCUMENTS

| 2,395,150 A | 2/1946 | Sloan et al. | |
|---|---|---|---|
| 3,066,314 A | 12/1962 | Filliung | |
| 3,485,105 A | 12/1969 | Johnson et al. | |
| 3,556,137 A * | 1/1971 | Billeter et al. | 137/543.15 |
| 4,014,577 A * | 3/1977 | Clancy et al. | 406/14 |
| 4,134,163 A | 1/1979 | Matsunaga | |
| 4,624,444 A | 11/1986 | Johnson | |
| 4,715,578 A | 12/1987 | Seltzer | |
| 4,753,570 A | 6/1988 | Jarvis et al. | |
| 4,883,254 A | 11/1989 | Whiteside | |
| 4,914,758 A * | 4/1990 | Shaw | 4/304 |
| 5,125,578 A | 6/1992 | Ballu | |
| 5,967,167 A * | 10/1999 | Johnson | 137/14 |
| 2007/0075284 A1 | 4/2007 | Masamura et al. | |

FOREIGN PATENT DOCUMENTS

| EP | 1279875 A2 | 1/2003 |
|---|---|---|
| FR | 2876762 A3 | 4/2006 |
| WO | WO 2005/048288 A1 | 5/2005 |

* cited by examiner

Primary Examiner — Stephen M Hepperle
Assistant Examiner — William McCalister
(74) Attorney, Agent, or Firm — Foley & Lardner LLP

(57) ABSTRACT

A control stop for a flush valve for a urinal or toilet fixture includes a housing defining a flow chamber divided by a valve seat into inlet and outlet sections. A valve structure is biased toward the valve seat by a spring applying a valve closing spring force. The housing is sealed by a diaphragm, and the diaphragm covers the movable valve structure, isolating it from water flowing through the housing. The diaphragm does not impede valve structure movement, and the closing spring force establishes a threshold water supply pressure for opening the control stop during increasing pressure following a no or low supply pressure condition. A plurality of control stops may supply a bank of flush valves and fixtures, and open in a cascading sequence during increasing pressure as a result of having springs with different closing spring forces.

2 Claims, 3 Drawing Sheets

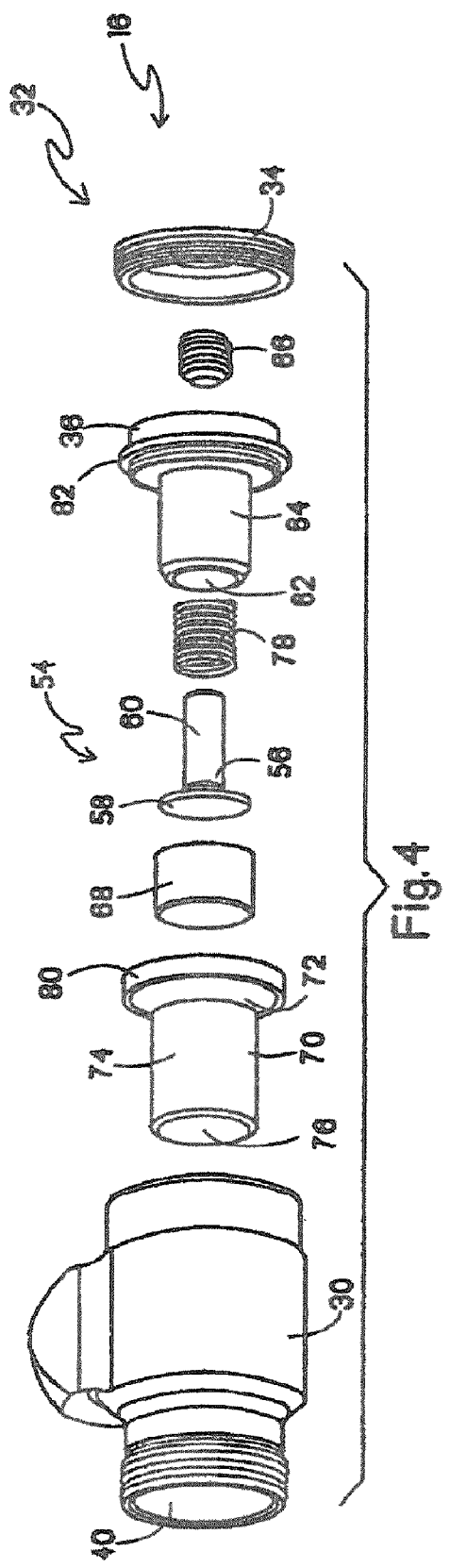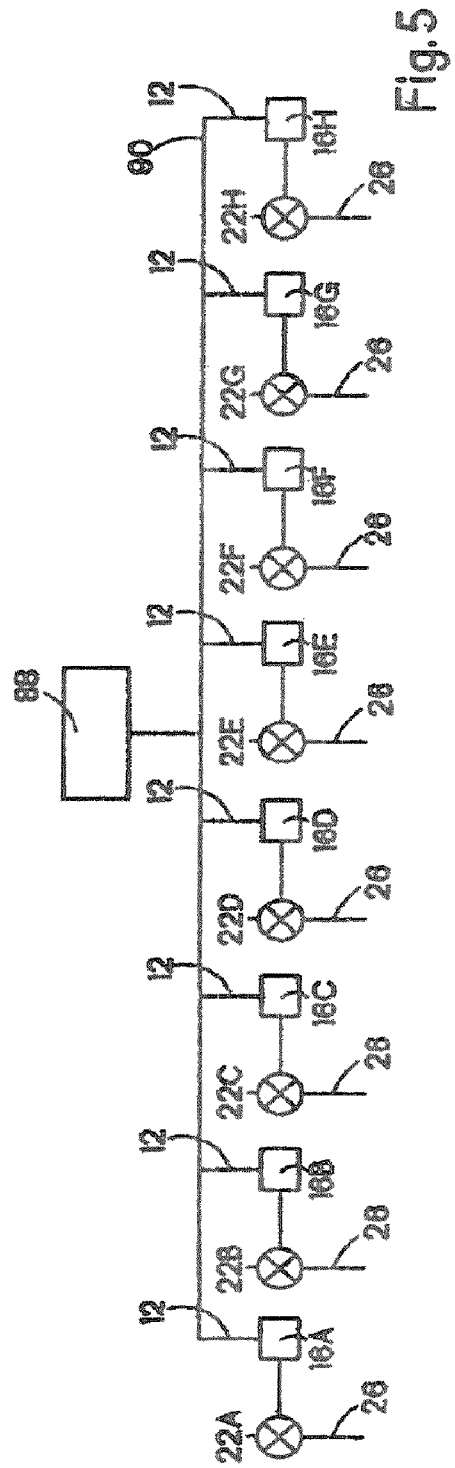

CONTROL STOP AND FLUSHING SYSTEM

CROSS-REFERENCE TO RELATED PATENT APPLICATIONS

This application is a divisional application and claims priority to U.S. patent application Ser. No. 11/445,399, filed Jun. 1, 2006 and is incorporated herein by reference in its entirety.

FIELD OF THE INVENTION

The present invention relates to improvements in control stops and to improvements in flushing systems including multiple control stops.

DESCRIPTION OF THE PRIOR ART

Flushing systems for urinal and toilet fixtures in applications such as commercial structures normally include a flush valve supplying water to flush each fixture. The flush valve is conventionally a flushometer type, capable of supplying a measured volume of water for the flushing operation. A device known as a control stop, or supply stop, is typically used to supply water to each flush valve. The control stop provides a flow resistance preventing excess water flow at elevated inlet pressures, thereby avoiding noise and improper flushing action. The control stop also prevents reverse flow in the event of supply pressure loss. The control stop can also function as a manually operated shut off for repair or replacement of the downstream flush valve or fixture.

An example of a typical control stop or supply stop is disclosed in U.S. Pat. No. 3,556,137. This device functions as a check valve with a valve plug biased by a relatively light spring toward a valve seat located at the inlet of the control stop. The relatively low forward cracking pressure resulting from the weak spring permits the flush valve to be supplied with water at low supply pressures. Because a typical flushometer valve requires substantial inlet pressure to operate to the fully closed condition, the supply of low pressure water to the valve permits the flush valve to run on or dribble. This wastes water, and can lead to flooding if the fixture drain is blocked. The typical supply or control stop has additional disadvantages because it requires a large quantity of material and has a large number of parts that must be manufactured and assembled.

Another known control stop is disclosed in U.S. Pat. No. 4,462,444. Both of these known control stop structures rely on sliding seals such as O-rings to permit movement of a valve structure while sealing and retaining water in the housing of the control stop. With this type of seal, movable components of the valve structure are exposed to water flowing though the control stop. This can lead to corrosion and leakage problems, and also limits the choice of materials available in manufacturing to materials that are unharmed by exposure to water. In addition, the use of sliding contact seals causes friction that impedes movement of the valve structure, leading to the need for larger valve biasing springs. Friction decreases sensitivity, preventing a consistent, accurate relationship between water pressure and control stop actuation.

In multiple fixture installations, a bank of fixtures, each having a control stop and a flush valve, are supplied in common from a single water supply header. A difficulty with this arrangement is that each flush valve requires a substantial supply pressure in order to operate from the open to the closed condition. Often the common water supply cannot simultaneously provide a sufficient supply of water for an entire bank of flush valves. For example, in the event of a water supply interruption when several flush valves are open, when the supply of water is resumed the valves cannot close. To overcome this problem, maintenance personnel must close the control stops supplying the bank of flush valves, and manually open them in sequence so that the water supply is sufficient for each flush valve in sequence to operate through a flush metering cycle and recluse.

SUMMARY OF THE INVENTION

A primary object of the present invention is to provide an improved control stop for supplying water to a flush valve in fixture flushing systems. Other objects are to provide a control stop that acts as a flow interrupter at low pressures and has a quick opening operation as water supply pressure increases; to provide a control stop wherein the moving valve structure is not exposed to water flowing through the device; to provide a control stop having little friction impeding movement of the valve structure; to provide a control stop using a minimum amount of material and a small number of parts; and to provide a control stop overcoming disadvantages of control stops used in the past.

Another object of the invention is to provide an improved flushing system having a bank of fixtures supplied from a common supply header through control stops and flush valves. Other objects are to provide a flushing system in which manual sequential control stop operation is not required for starting up a system with several open flush valves; to provide a flushing system in which different control stops are operated to the open condition at different water supply pressures; and to provide a flushing system overcoming disadvantages or flushing systems used in the past.

In brief, in accordance with the present invention, there is provided a control stop for connection between a pressurized water source and a flush valve. The control stop includes a housing defining an elongated flow chamber having a longitudinal axis. A valve seat is located in the flow chamber. A valve structure in the flow chamber moves in the direction of the axis relative to the valve seat for controlling flow through the flow chamber. A generally hat shaped flexible diaphragm includes a brim portion connected in sealing relation to the housing and includes a crown portion enclosing the valve structure.

In brief, in accordance with another aspect of the invention, there is provided a flushing system for a plurality of urinal and/or toilet fixtures. The flushing system includes a plurality of flush valves, each connected to supply water to one of the fixtures and a plurality of control stops, each connected to supply water to one of the flush valves. Each of the flush valves has a threshold inlet supply pressure during increasing supply pressures at which the flush valve operates from closed to open position. In order that the flush valves open in sequence and not simultaneously during increasing pressure following a supply interruption, the threshold pressure of at least a first of the plurality of control stops is different from the threshold pressure of at least a second of the plurality of control stops.

BRIEF DESCRIPTION OF THE DRAWING

The present invention together with the above and other objects and advantages may best be understood from the following detailed description of the preferred embodiment of the invention illustrated in the drawings, wherein:

FIG. 4 is an exploded isometric view of the control stop; and

FIG. 5 is a block diagram of a plumbing system in accordance with the present invention including a plurality of flush valves and control stops.

DETAILED DESCRIPTION OF THE PREFERRED EMBODIMENT

Figure 1:
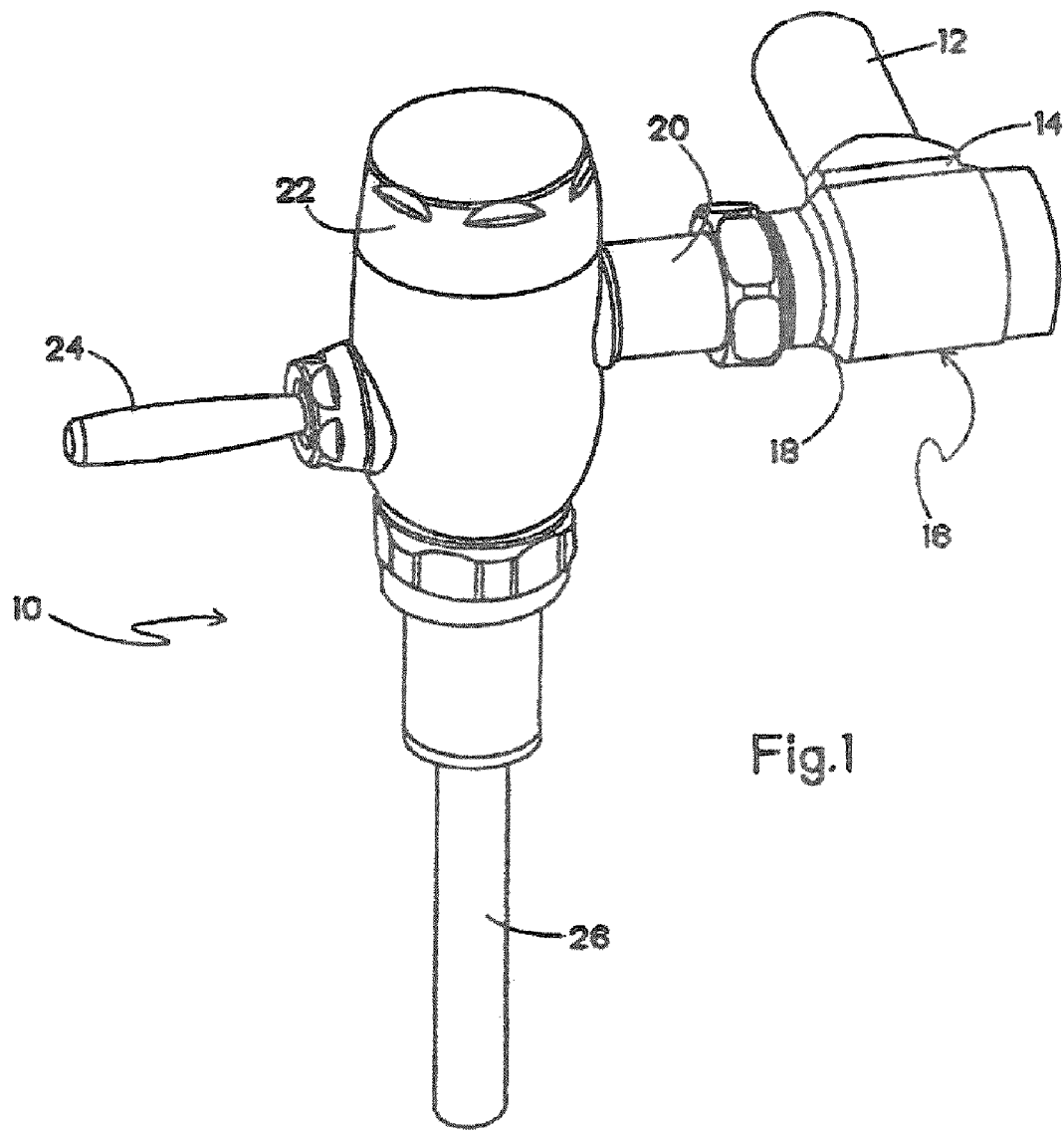
FIG. 1 is an isometric view of a plumbing installation including a flush valve and a control stop constructed in accordance with the present invention.

Having reference now to the drawing, and initially to FIG. 1, there is illustrated a plumbing installation generally designated as 10 for flushing a urinal or toilet fixture (not shown). The plumbing installation 10 has a water supply conduit 12 through which water is supplied from a pressurized source such as a municipal or local water supply system. Conduit 12 supplies water to the inlet 14 of a control stop 16, and water from the control stop 16 is supplied from an outlet 18 to a transfer conduit 20 and to a flush valve 22. For a flushing operation, an operating handle 24 is displaced, and as the flush valve operates through a flush cycle, a measured quantity of water travels to the fixture through an outlet conduit 26. The principles of the present invention may be applied to systems using flush valves other than manually operated valves, including timer operated automatic valves and user detection responsive valves.

Figure 2:
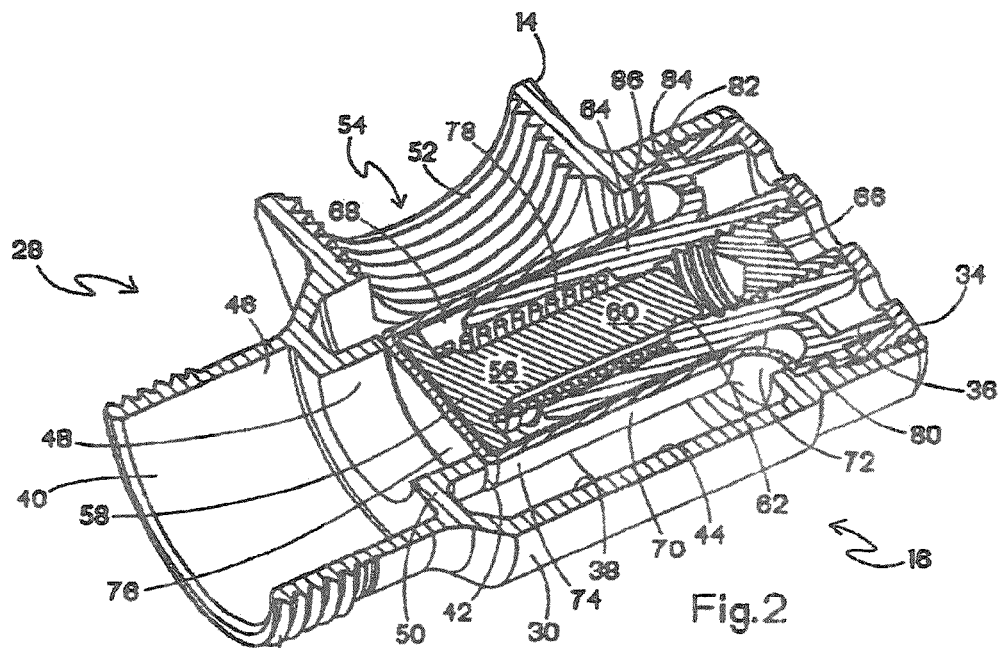
FIG. 2 is an enlarged cross sectional view taken along the longitudinal axis of the control stop of FIG. 1, showing the control stop in the closed position.
Figure 3:
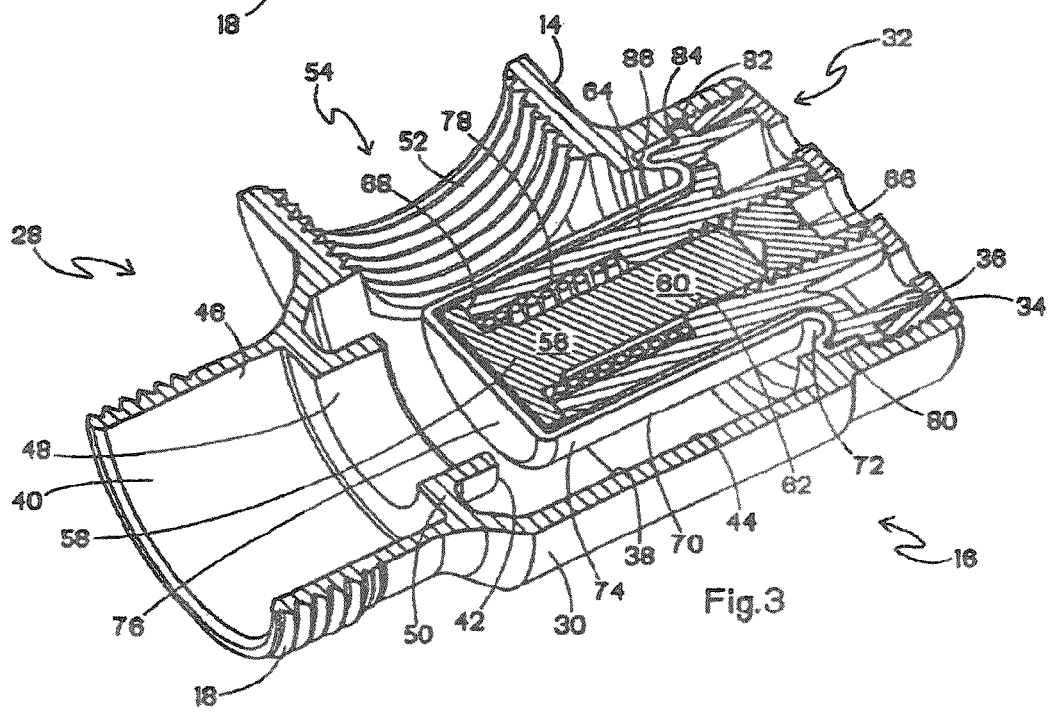
FIG. 3 is a view like FIG. 2 showing the control stop in the open position.

The control stop 16 is constructed in accordance with the principles of the present invention, and is illustrated in detail in FIGS. 2-4. A housing 28 of the control stop 16 includes a body 30 and a cap 32. The cap 32 includes an outer cap portion 34 and an inner member or insert 36. The body and the outer cap 34 are preferably made of brass and may be chrome plated. Because the outer cap 34 is not exposed to water flowing through the housing 28, it may be made of 360 brass if desired. The insert 36 is also not exposed to flowing water and may be made of glass filled nylon if desired.

The housing 28 defines an elongated interior flow chamber 38 extending in an axial direction toward an outlet port 40 provided at the outlet 18. An annular valve seat 42 divides the chamber 38 into an inlet portion 44 and an outlet portion 46 communicating with the outlet port 40. The valve seat 42 is defined by the edge of a cylindrical wall 48 extending in the upstream axial direction from a transverse wall 50. An inlet port 52 extending transversely to the axis of the elongated flow chamber 38 introduces water from the supply conduit 12 and inlet 14 (FIG. 1) into the inlet portion 44 of the flow chamber 38.

A valve structure 54 moves toward and away from the valve seat 42 to control flow from the inlet port 52 through the flow chamber 38 to the outlet port 40. In the closed position seen in FIG. 2 the valve structure 54 contacts the valve seat 42 to prevent the flow of water. In the open position seen in FIG. 3, the valve structure 54 is spaced from the valve seat 42 and water can flow through the control stop 16.

The valve structure 54 includes a valve member 56 that may be made of a wide choice of materials such as plastic because it is not exposed to water flowing through the control stop 16. The valve member 56 has a head portion 58 generally corresponding in shape and size to the valve seat 42, and a stem portion 60 slideably received in a guide collar 62 in an axially extending hub portion 64 of the insert 36. The full open position of the valve member 56 is defined by contact of the stem portion 60 with an adjustable abutment set screw 66 threaded into the hub portion 64 of the insert 36. The set screw 66 is adjusted to set the flow restriction provided by the control stop 16. In addition, the set screw 66 is threaded fully inward to manually close the valve structure against the valve seat and shut off all flow through the control stop 16.

In addition to the valve member 56, the valve structure 54 includes a cup 68 and a diaphragm 70. The diaphragm 70 is made of a flexible, resilient, water impervious material such as propylene rubber or nitrile rubber, and is generally hat shaped with a brim portion 72 and a crown portion 74. The cup 68 and the diaphragm crown portion 74 are similar in shape, and, in the illustrated embodiment, generally have the shape of a closed ended right circular cylinder. The cup 68 may be made of stainless steel, and is interposed between the head portion 58 of the valve member 56 and the crown portion 74 of the diaphragm 70. The cup 68 supports the diaphragm 70, and the crown portion 74 has a flat circular end wall 76 that seats against the valve seat 42 in the closed position of the control stop 16.

A coil spring 78 is in compression between the insert 36 and the head portion 58 of the valve member 56. The spring 78 biases the valve structure 54 toward the closed position in which the wall 76 of the diaphragm 70 contacts the valve seat 42.

The elements of the movable valve structure 54, other than the diaphragm 70, are isolated by the diaphragm 70 from water flowing through the flow chamber 38. The brim portion 72 of the diaphragm 70 includes an axially extending peripheral rim portion 80. The outer cap 34 is threaded into the end of the body 30 and captures an outer flange 82 of the insert against a positioning shoulder 84 of the body 30. The peripheral rim portion 80 of the resilient diaphragm 70 is captured in sealing relation between the flange 82 of the insert 36 and a seal shoulder 86 of the body 30. Because the moving parts of the control stop 16 are separated by the diaphragm 70 from the flow of water, reliability is improved and problems of corrosion and leakage are avoided.

In the absence of water pressure, for example upon initial installation or following a repair or replacement of a flush valve or fixture, the control stop is initially in the closed position of FIG. 2 because the spring 78 holds the valve structure 54 against the valve seat 42. Water supply pressure acts in the opening direction against the portion of the diaphragm radially outside of the valve seat 42—essentially the brim portion 72. A substantial predetermined threshold opening pressure is determined by the spring force of the spring 78. For example, in the illustrated preferred embodiment of the invention, the spring 78 may be selected to apply a closing force of 3.5 pounds when the valve structure 54 is closed (FIG. 2) and a closing force of 5 pounds when the valve structure 54 is open and the spring 78 is further compressed (FIG. 3). In this configuration, the threshold supply pressure for opening the valve structure 54 is about 7.6 pounds per square inch (psi).

When the predetermined threshold supply pressure is reached, the closing force of the spring 78 is overcome and the valve structure 54 strokes toward moves to the open position of FIG. 3. As the valve structure 54 opens, the spring force increases, but the area of the diaphragm 70 exposed to supply pressure is larger, and the supply pressure required to maintain the control stop 16 in the open position decreases from the initial threshold of about 7.6 psi to about 4.7 psi. This provides a snap acting, bistable operation as the valve structure 54 reliably and quickly strokes to the full open position when the threshold pressure is reached. In this example, if supply pressure drops to a level below about 4.7 psi, the control stop returns to the closed position of FIG. 2.

The threshold pressure is large enough to assure reliable flush valve operation when the control stop 16 opens. In addition, at low pressures, the control stop acts to positively block all flow so that the flush valve is not exposed to low pressure conditions in which it may not operate reliably.

The diaphragm seals against leakage from the housing 28 while permitting movement of the valve structure 54 with very little resistance to valve movement. The friction resulting from an O-ring seal or other sliding seal is eliminated. As a result, the opening operation of the valve in response to inlet pressure is highly sensitive, and the control stop 16 opens reliably at the threshold pressure established by the spring force imposed by spring 78. This spring force can be selected to accurately determine a threshold opening pressure, and this feature can be used to provide improvements in multiple flush valve systems FIG. 5 illustrates a flushing system including a number or bank of eight flush valves 22A-22H. Each flush valve is supplied with water from a corresponding control stop 16A-16H, all preferably having generally the structure of the control stop 16 illustrated in FIGS. 2-4. The bank of flush valves 22A-22H is supplied with water from a source 88 of pressurized water through a common header 90 connected to all of the supply conduits 12.

The flush valves 22A-22H require a residual pressure to keep them closed. Therefore in the event of an interruption in the water supply, some or all of the flush valves 22A-22H may be in an open condition. The flush valves cannot operate through a mastered flush cycle and reclose unless they are supplied with a predetermined minimum water pressure, for example, 5 psi. The header 90 and water supply 88 do not have the capacity to supply sufficient water for simultaneously operating the entire bank flush valves 22A-22H through a flushing cycle.

In order to overcome this problem, different ones of the control stops 16A-16H have different, graduated threshold supply pressures. This is accomplished by providing the control stops with springs 78 having different spring forces. The following table provides one illustration of approximate threshold pressures resulting from graduated spring forces.

TABLE 1

| Control stop | Spring Force | Threshold Pressure |
|---|---|---|
| 16A, 16B | 3.5 pounds | 7.6 psi |
| 16C, 16D | 4 pounds | 8.7 psi |
| 16E, 16F | 4.5 pounds | 9.8 psi |
| 16G, 16H | 5 pounds | 10.9 psi |

Following a water supply interruption, as water supply pressure increases, the flush valves are operated and cycled to closed positions in a cascading sequence rather than simultaneously. In this example, the springs 78 of the control stops 16A and 16B apply a valve closing force in the closed position of the valve structure 54 of 3.5 pounds. When the supply pressure reaches about 7.6 psi, these two control stops 16A and 16B rapidly move to the open position. The source 88 and header 90 have sufficient capacity for simultaneous operation of two flush valves, and flush valves 22A and 22B are reliably cycled to the closed position without the need for manual control of the control stops.

When the supply pressure subsequently increases to the next threshold value of about 8.7 psi, the control stops 16C and 16D, with a closing spring force of 4 pounds, open and the corresponding flush valves 22C and 22D are operated through a flush cycle and close. Similarly, at the subsequent threshold supply pressure of about 9.8 psi, the control stops 16E and 16F, with a closing spring force of 4.5 pounds, open to operate flush valves 22E and 22F, and finally at a threshold supply pressure of about 10.9 psi, the control stops 16G and 16H, with a closing spring force of 5 pounds, open to operate flush valves 22G and 22H.

This operating principle could be employed to simultaneously operate more than two flush valves at a time, or to control a bank of flush valves to open one at a time. The sequencing of flush valve operation at increasing supply pressures could be achieved with control stops different from the control stop 16 described in detail above. However, in the control stop 16 the use of the diaphragm 70 rather than an O-ring or other sliding contact seal results in a reduction of friction. The low friction operation makes it possible for control stops with different spring forces to open reliably at different threshold pressures. It could be more difficult, to accomplish this with other known control or supply stops lacking sensitivity in the relationship between spring force and opening supply pressure.

While the present invention has been described with reference to the details of the embodiments of the invention shown in the drawing, these details are not intended to limit the scope of the invention as claimed in the appended claims.

The invention claimed is:

1. A flushing system for a plurality of urinal and/or toilet fixtures, said flushing system comprising:
   a plurality of flush valves, each connected to supply water to one of the fixtures;
   a plurality of control stops, each connected to supply water to one of said flush valves;
   each said flush valve having a threshold inlet supply pressure during increasing supply pressures at which the flush valve operates from closed to open position; and
   the threshold pressure of at least a first of the plurality of control stops being different from the threshold pressure of at least a second of the plurality of control stops.

2. The flushing system of claim 1, each said control stop having a valve seat and a valve structure movable relative to the valve seat, each said control stop having a spring biasing said valve structure toward the valve seat with a closing spring force, the closing spring force of said first control stop being smaller than the closing spring force of said second control stop.

* * * * *

UNITED STATES PATENT AND TRADEMARK OFFICE
CERTIFICATE OF CORRECTION

| | | |
|---|---|---|
| PATENT NO. | : 8,028,719 B2 | Page 1 of 1 |
| APPLICATION NO. | : 12/510025 | |
| DATED | : October 4, 2011 | |
| INVENTOR(S) | : Dwight N. Johnson | |

It is certified that error appears in the above-identified patent and that said Letters Patent is hereby corrected as shown below:

IN THE SPECIFICATION:

Column 5, line 29, delete "mastered" and replace it with --metered--.

Signed and Sealed this
Third Day of January, 2012

David J. Kappos
*Director of the United States Patent and Trademark Office*